(12) United States Patent
Morin

(10) Patent No.: US 9,457,705 B2
(45) Date of Patent: Oct. 4, 2016

(54) LOW PROFILE WHEEL CHOCKING SYSTEM AND CHOCK CONSTRUCTION

(71) Applicant: Holland, L.P., Crete, IL (US)

(72) Inventor: Andrew J. Morin, Mokena, IL (US)

(73) Assignee: Holland, L.P., Crete, IL (US)

( * ) Notice: Subject to any disclaimer, the term of this patent is extended or adjusted under 35 U.S.C. 154(b) by 0 days.

(21) Appl. No.: 14/731,065

(22) Filed: Jun. 4, 2015

(65) Prior Publication Data

US 2015/0343939 A1    Dec. 3, 2015

Related U.S. Application Data

(62) Division of application No. 13/783,560, filed on Mar. 4, 2013, now Pat. No. 9,079,523.

(51) Int. Cl.
*B60P 7/08* (2006.01)
*B60P 3/077* (2006.01)
*B60P 3/075* (2006.01)

(52) U.S. Cl.
CPC ............... *B60P 3/077* (2013.01); *B60P 3/075* (2013.01)

(58) Field of Classification Search
CPC ................................ B60P 3/077; B60P 3/075

USPC ...... 410/20, 30, 8, 9, 10, 11, 12, 19, 21, 23, 410/50, 100

See application file for complete search history.

(56) References Cited

U.S. PATENT DOCUMENTS

| | | | | |
|---|---|---|---|---|
| 5,037,255 A | * | 8/1991 | Bullock | B60P 3/077 410/19 |
| 9,079,523 B2 | * | 7/2015 | Morin | B60P 3/075 410/30 |

* cited by examiner

*Primary Examiner* — Stephen Gordon
(74) *Attorney, Agent, or Firm* — Scherrer Patent & Trademark Law, P.C.; Stephen T. Scherrer; Monique A. Morneault

(57) ABSTRACT

A wheel chock is constructed from metallic material has an elongate primary body construction. The primary body construction has a Π-shaped transverse cross-section formed by an upper C-shaped channel construction and a lower planar basal construction. The basal construction has U-shape that extends orthogonally relative to the C-shape of the channel construction. The Π-shaped transverse cross-section bears and distributes stress imposed on the primary body construction. The C-shaped channel construction preferably includes a series of apertures for reducing weight and controlling elastic response of the primary body construction. Among these apertures are edge-based apertures, arm-based stress relief slots, and aligned apertures having sequentially decreasing diameters.

7 Claims, 15 Drawing Sheets

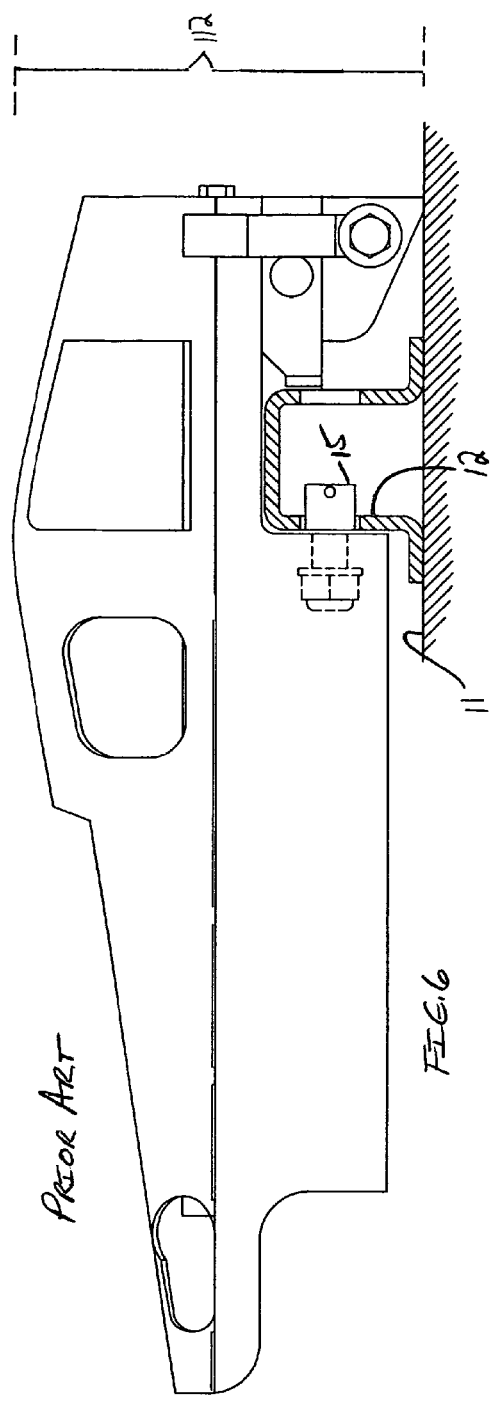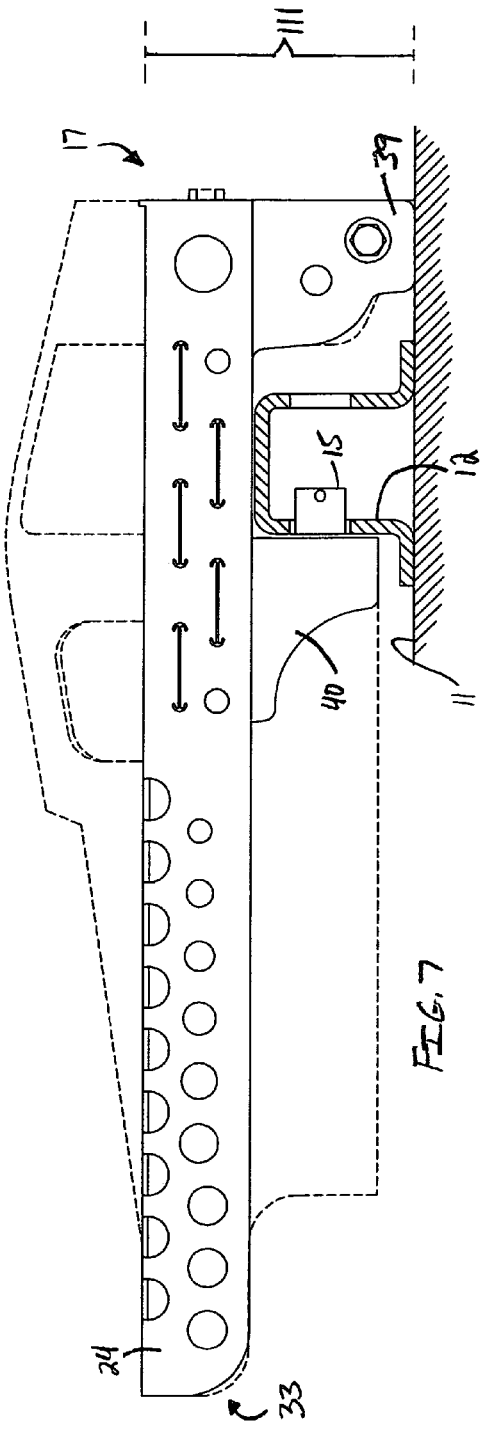

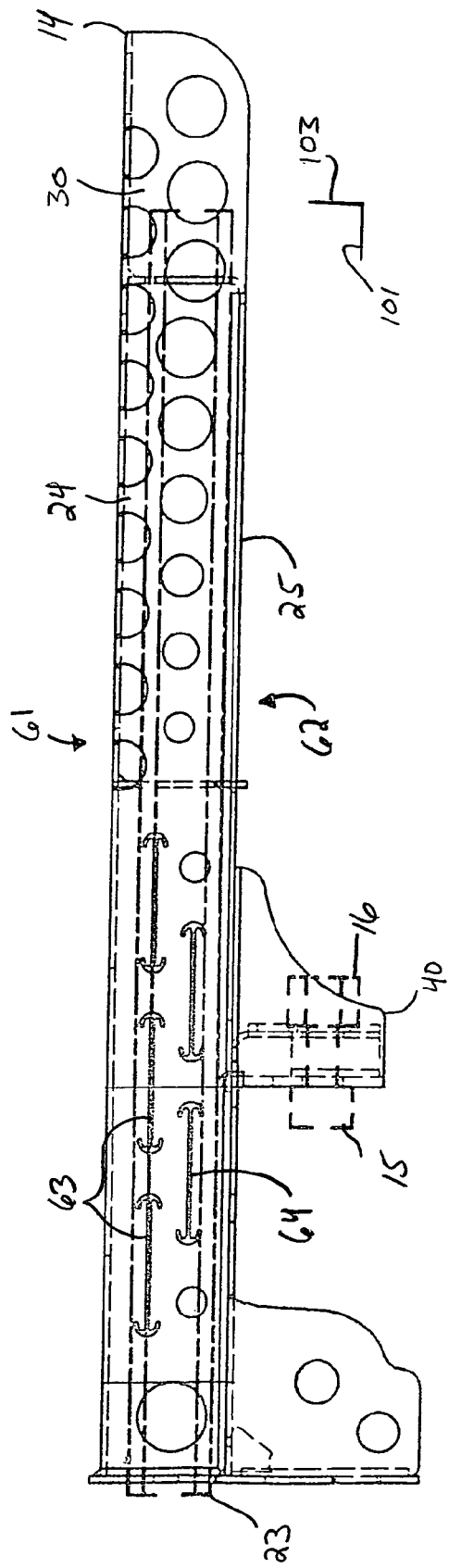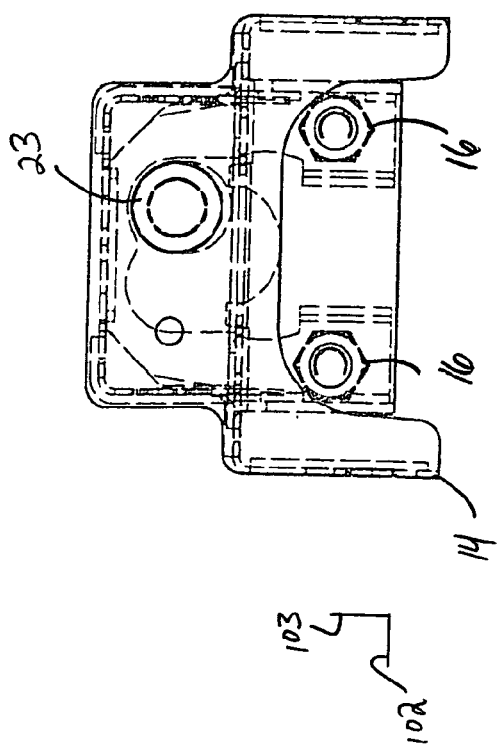
FIG. 9
FIG. 9(A)

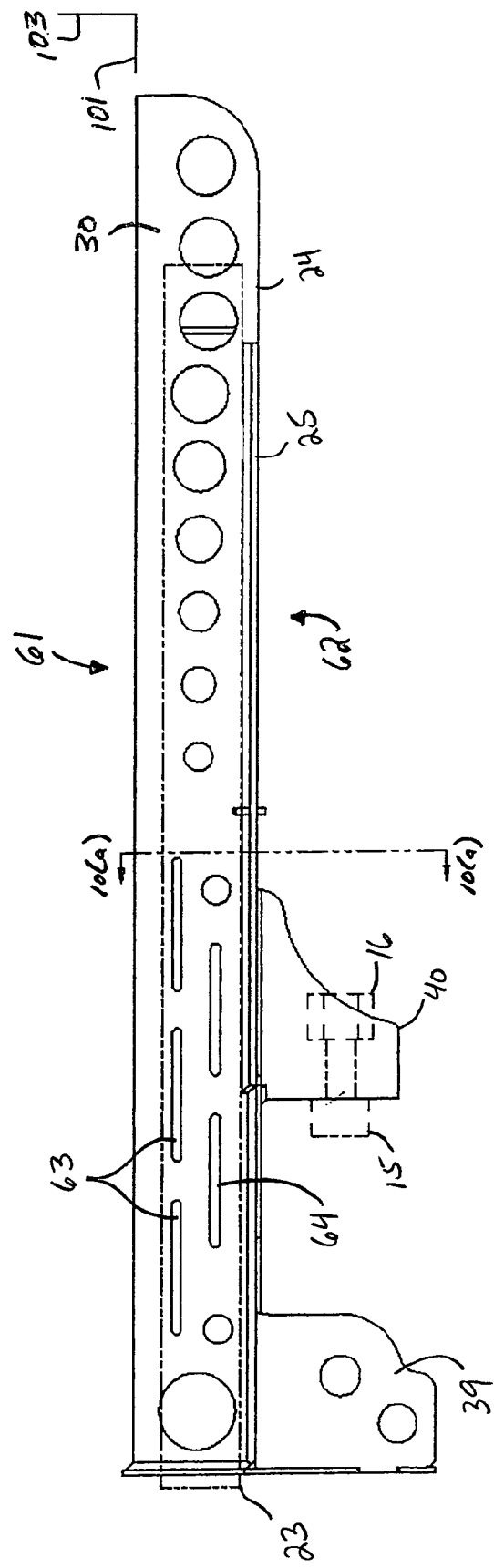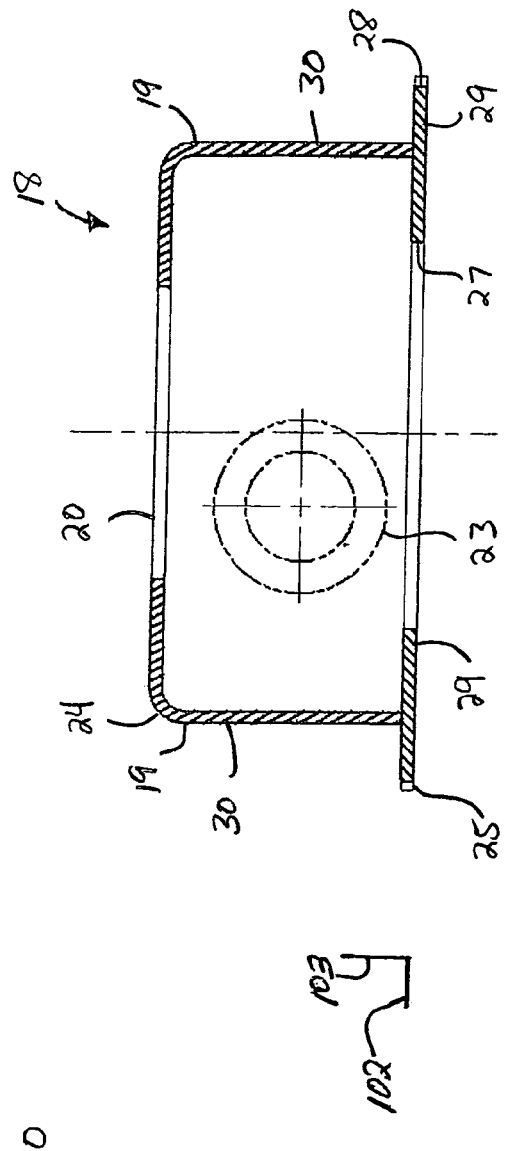
FIG. 10
FIG. 10(A)

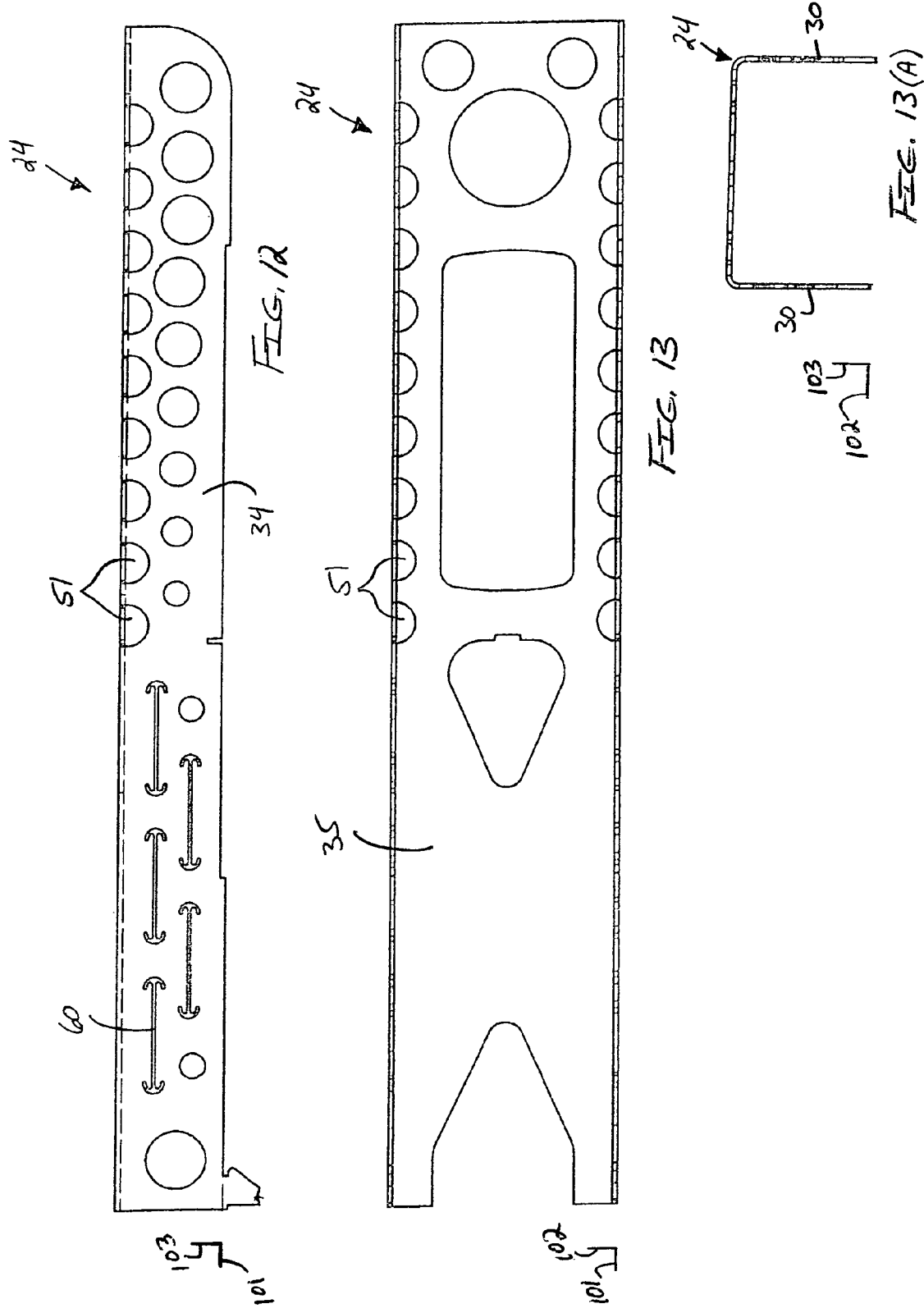

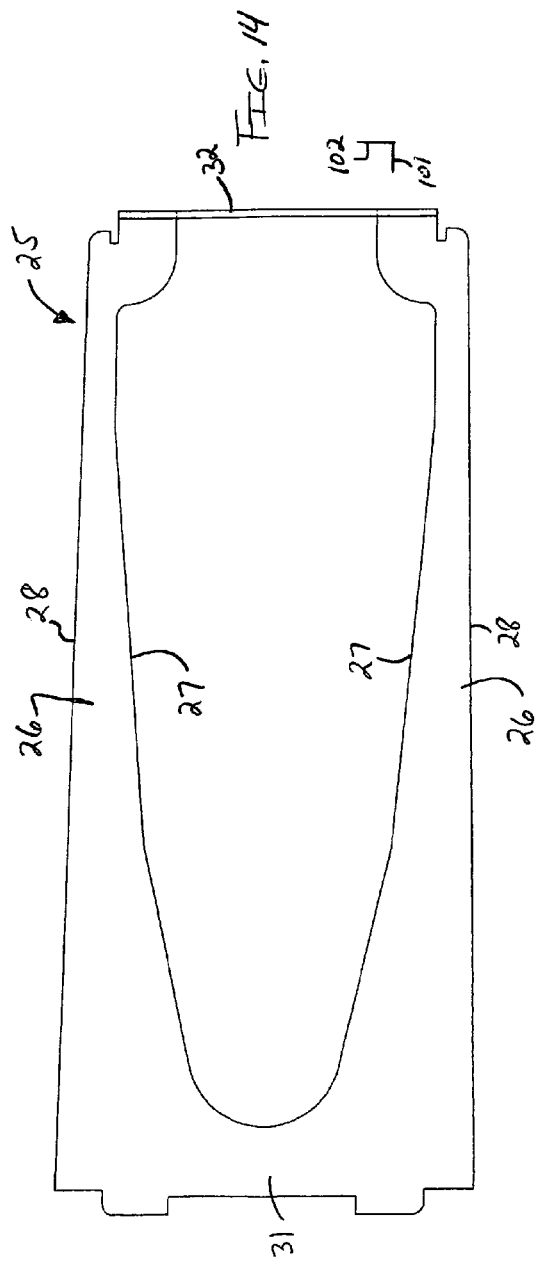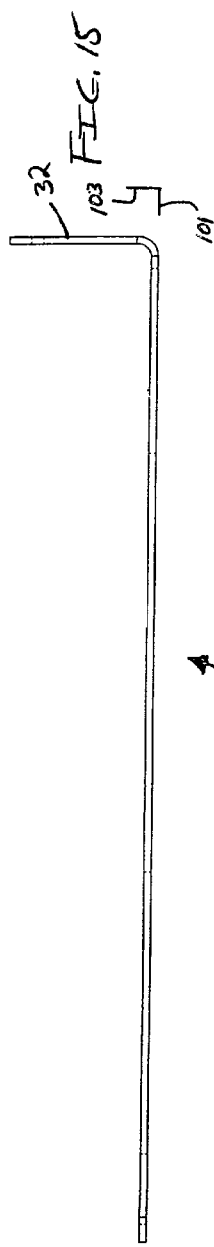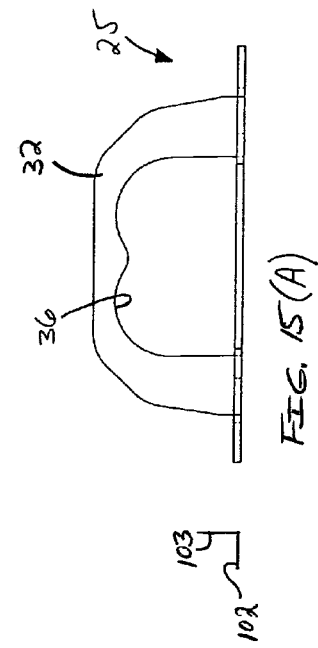

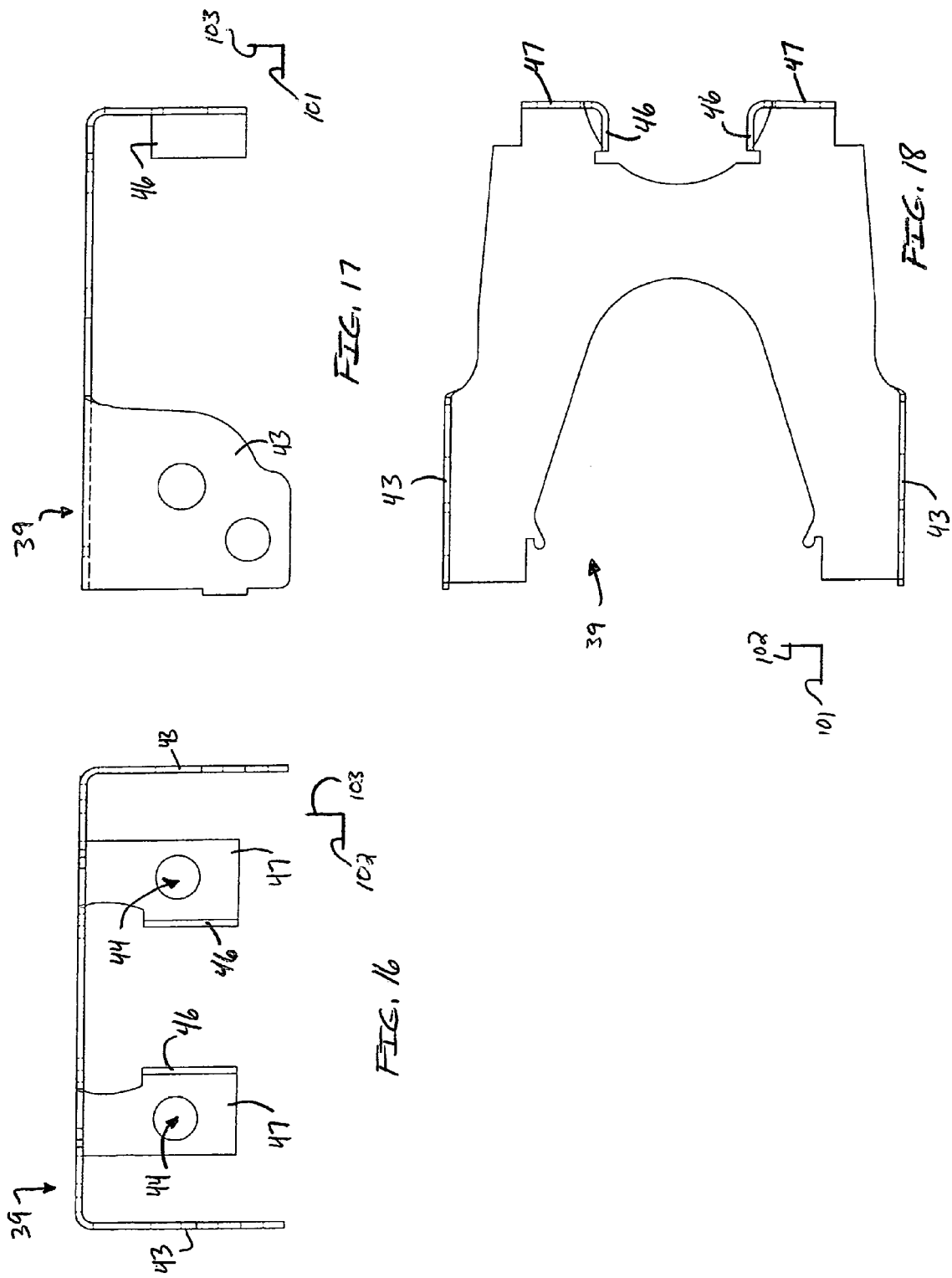

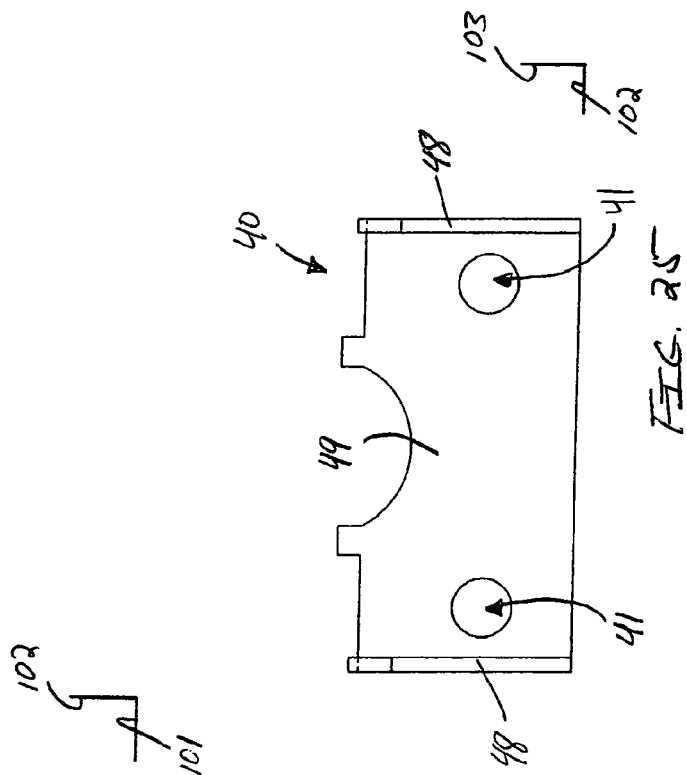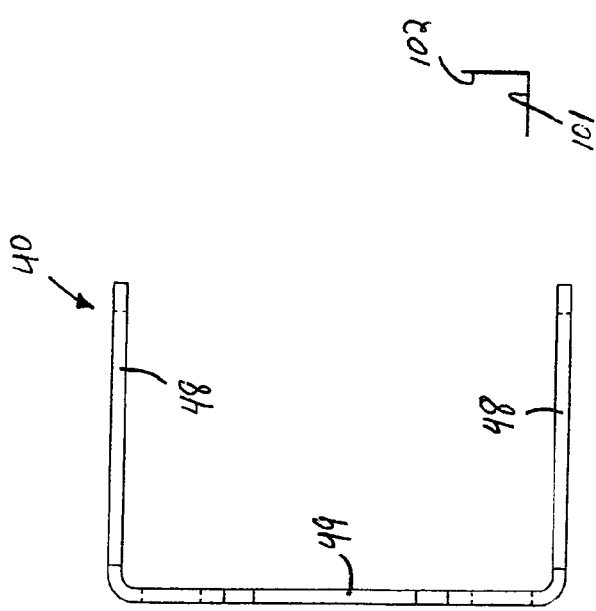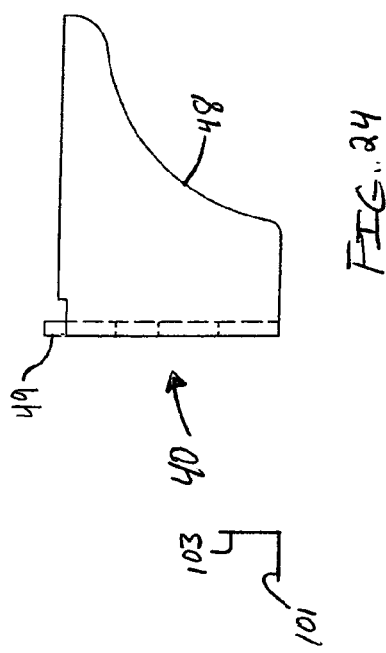

LOW PROFILE WHEEL CHOCKING SYSTEM AND CHOCK CONSTRUCTION

BACKGROUND OF THE INVENTION

1. Field of the Invention

The present invention generally concerns a wheel chocking system for securing motor vehicles on the decks of transporters as exemplified by railway cars. More particularly, the present invention concerns a low-profile, high strength, metallic chock construction for restraining and securing a vehicular wheel to a wheel support surface.

2. Discussion of the Prior Art

For many years, vehicular wheel-to-railcar securement means were defined by tie down chains which interconnected the vehicle body and the structure of the railcar and which were tightened to compress the suspension springs of the vehicle. More recently, increasing attention has been given to restraint schemes employing vehicular wheel chocks.

Early vehicular wheel chock constructions and chocking systems employed cast chock constructions consisting of lightweight polymeric or aluminum type materials as exemplified by those mechanisms disclosed and described in U.S. Pat. No. 4,875,813, issued to Moyer et al. and U.S. Pat. No. 5,316,421, issued to Bullock et al. At that time, rail industry standards called for vehicular wheel chocks adapted for releasable attachment to a prescribed mounting rail of hat shape in cross section extending lengthwise of the support deck and each of whose upright walls contains a uniform pattern of locking holes. Current industry mandates call for lower-profile wheel chock constructions in view of the recent trend in vehicular design toward vehicles with reduced clearance between the ground and their underbody, and toward reduced clearance between the vehicles wheels and the internal surfaces of the vehicular wheel wells.

The railroad industry has thus provided a clear instruction, namely, to establish a new generation of "low-profile" vehicular transport wheel chocks having a maximal side elevational height of about 4 inches (or about 10 cm) in order to ensure that the vehicular wheel chocking system and vehicular wheel chock construction would structurally cooperate with vehicles having these newly developing low clearance concerns.

Early vehicular wheel chock assemblies may be exemplified by the invention made the subject of U.S. Pat. No. 4,875,813 ('813 patent), issued to Moyer, et al. The '813 patent discloses a Wheel Chock for restraining motor vehicles during railway transport. The chock according to the '813 patent comprises a monolithic body defined by a synthetic plastic molding or an aluminum casting and is provided with a pair of locking pins and a latching mechanism for releasably securing it to a mounting rail fixed on a deck of the vehicle transporter. The chock also incorporates a reeling mechanism, including a pawl and ratchet locking device, for holding and tensioning an over-the-wheel safety harness.

U.S. Pat. No. 5,037,255 ('255 patent), and U.S. Pat. No. 5,316,421, both of which issued to Bullock et al., disclose certain relatively newer chocking systems. The '255 and '421 patents both describe a wheel chock quite similar to the Moyer chock for a motor vehicle, which chock is primarily constructed from a composite material and adapted to be selectively connected to a pair of rails fastened to the container floor. The flexible copolymer material of the chock body is said to be capable of withstanding loads incurred by vehicles restrained by the chocks, and which is constructed to be easily connected to and disconnected from the rails and be supported above the container floor to prevent damage to the floor.

The chock of the '421 patent is further said to be user friendly in that it can be maintained in a wheel-restraining position together with a wheel harness and removed from that position without the use of any tools. The wheel chock includes a torque tube for winding up a wheel harness strap to tighten the wheel harness on a vehicle wheel, a strap take-up device for quickly removing the slack in the strap, and a foot-operated actuating lever for rotating the torque tube and operating a pawl and ratchet mechanism controlling rotation of the torque tube.

The chock bodies shown and described in at least the Bullock patents, as well as perhaps the Moyer chock body, being made of plastic, would structurally requires a more robust steel plate in order to carry the vertical load imparted when a secured car tire tries to roll or slide away from it. Diagrams in the disclosure of Moyer suggest that the Moyer plastic body alone is designed to effectively resist all functional loads the chock might experience. However, the diagrams in the Bullock disclosure quietly admit that there is a ⅛" thick metallic support plate coupling the main axis of the winch (designated with number 85 in FIGS. 2 and 3 of Bullock and elsewhere) to the pair of bolts also known as track pins (designated with number 43 in FIGS. 2 and 3 of Bullock).

A side by side comparison of FIG. 3 from the Moyer disclosures in U.S. Pat. No. 4,875,813 and FIGS. 2 and 3 from the Bullock et al. disclosures in U.S. Pat. No. 5,316,421 illustrate a key structural difference (i.e. a steel plate) between those two chock constructions although Bullock et al. are silent in their specification regarding the additional of a metallic structural plate to overcome the design defects of the Moyer et al. chock assembly.

Referencing Column No. 4, Line Nos. 7-11 of Moyer et al., the reader will note that the Moyer pins 36 and Moyer nuts 37 function to attach the (polymeric or aluminum cast) structural member or web 26 to the rail 32. Referencing Column No. 4, Line Nos. 13-28 of Bullock et al. the reader will note that Bullock pins 43 are mounted to the (polymeric) web 31 via nuts 45 and washers 46. Comparatively referencing FIG. 3 of Moyer et al. versus FIGS. 2 and 3 of Bullock et al., however, the reader will further detect a structural form present in Bullock et al. intermediate the web 31 and the head of pins 43. This structural form is a steel plate, introduced into Bullock et al. chock to enhance its strength and prevent structural fracturing during loading events.

The Moyer patent represents what is known within the rail shipping industry as the $1^{st}$ generation of the Standard Car Truck Company's Copolymer chock. This chock quickly had performance problems in the field, often releasing itself from the railcar deck and allowing damage to the cargo. The response to Moyer chock was the addition of the metal support plate shown but not discussed in the Bullock et al. patent, and this latter version became known as the $2^{nd}$ generation. Those with the "user friendly" enhancements detailed in Bullock became known as the $3^{rd}$ generation.

Environmental extremes are well known to cause problems for the copolymer chock body's plastic material exemplified by Moyer and Bullock. Cold temperatures render the material brittle and subject to fracture during unloading operations, when conditions also require the breaking of ice that has adhered to the device during transport. Hot weather renders the material more flexible and soft, increasing the likelihood that the device may fail under loading during impact conditions such as those described above.

The focus on constructing a primary chock body from polymeric materials has clouded certain opportunities for further development in this field, particularly in view of the fact that attempts to improve upon the state of the art included the addition of metallic structural supports for strengthening the polymeric materials. The present response to the perceived need in the art involves addressing the complexity of the many walls and passages in the polymeric design, and designing a relatively more robust steel or metallic fabrication that is both cost effective and substantially similar in weight to the prior art polymeric chock designs.

SUMMARY OF THE INVENTION

The perceived need in the art was to produce a strong metallic chock body that meets customer requirements. The design of the subject device is thus centered around a sheet metal formed C-channel construction with the concavity oriented downward and additional strips of metal affixed at the tips that define the channel mouth. The overall effect of this assembly is to produce two interconnected I-beams on either side of the torque tube assembly which acts as the main axis of the winch. When the device is loaded in service it is these dual I-beam features which carry, distribute and cushion the stresses and strains.

Due to the dual I-beams, the strength of the device is produced in a cross sectional shape only two inches high. This allows the distal end of the device, beyond the area where the track pins are affixed, to be much thinner than the bulk of the body. The small cross-section in this area eases the task of installing the chock into its working position, the tight quarters around the wheels of a vehicle.

The chock body according to the present invention includes many apertures for different purposes: Several large holes are located at the far end from the winch/ratchet mechanism that essentially function to reduce the weight of the unit. Next, considering the various openings positioned progressively closer to the ratchet, the weight-reduction role of each aperture increasingly transitions to offering an elastic response to the loads experienced in service.

As the ultimate expression of this, there is a pattern of long thin slots above the track pins whose entire function is that of controlling elastic response in the primary body construction. The slots are preferably placed in the web region of both I-Beam features where little stress or strain would normally be observed in their absence. When a vertical load is applied, these slots allow the I-beams to more elastically respond to the force thereby reducing the impact on the chock structure itself as well as on the automobile being secured.

When an upward vertical load is applied by the tire securement strap, the force causes the body to bend upward. At the same time, the strain relief slots tend to open vertically providing a sink for strain energy in the form of elastic bending and buckling in the slot region. This action also extends the depth of the each of the dual I-beams effectively increasing their moment of inertia and thus their bending resistance against the applied load.

BRIEF DESCRIPTION OF THE DRAWINGS

Other features of my invention will become more evident from a consideration of the following brief descriptions of illustrations of the subject invention:

FIG. 6 is a side elevational view of a prior art chock assembly presented to show the relative height of the prior art chock assembly.

FIG. 7 is a side elevational view of a portion of the chock assembly according to the present invention depicted as being disposed in front of the prior art chock assembly otherwise shown in FIG. 6 to comparatively show the relative heights of the chock assemblies.

FIG. 9 is a lateral or side elevational view of the structures otherwise shown in FIG. 8.

FIG. 9(A) is a distal end view of the structures otherwise shown in FIG. 9.

FIG. 10 is a lateral or side elevational view of an alternative embodiment of the primary body construction according to the present invention depicting relative placement of a torque tube and fastening track pin assemblies (shown in broken lines) cooperatively associated with the chock assembly according to the present invention.

FIG. 10(A) is a transverse cross-sectional view of the structures otherwise shown in FIG. 10.

FIG. 12 is a lateral or side elevational view of a C-shaped channel construction of the primary body construction according to the present invention.

FIG. 13 is a top view of the C-shaped channel construction otherwise shown in FIG. 12.

FIG. 13(A) is a distal end view of the C-shaped channel construction otherwise shown in FIGS. 12 and 13.

FIG. 14 is a top view of a forward pan element of the primary body construction according to the present invention.

FIG. 15 is a lateral or side elevational view of the forward pan element otherwise shown in FIG. 14.

FIG. 15(A) is a distal end view of the forward pan element otherwise shown in FIGS. 14 and 15.

FIG. 16 is a proximal end view of a rear pan element of the primary body construction according to the present invention.

FIG. 17 is a lateral or side elevational view of the rear pan element otherwise shown in FIG. 16.

FIG. 18 is a top view of the rear pan element otherwise shown in FIGS. 16 and 17.

FIG. 23 is a top or dorsal edge view of a rail-interface support plate of the primary body construction according to the present invention.

FIG. 24 is a lateral or side elevational view of the support plate otherwise shown in FIG. 23.

FIG. 25 is a distal view of the support plate otherwise shown in FIGS. 23 and 24.

DETAILED DESCRIPTION OF THE PREFERRED EMBODIMENT

The present invention essentially provides a low-profile, primarily metallic, vehicular wheel chock construction and chocking system for chocking and restraining a vehicular wheel 10 borne upon a support surface 11 adjacent a rail 12. The reader will note that the each chock assembly as depicted and referenced at 13' and 13" of the chocking system according to the present invention has a primary length extending in a first dimension, which dimension is generally indicated at 101 in FIG. 1.

Figure 1:
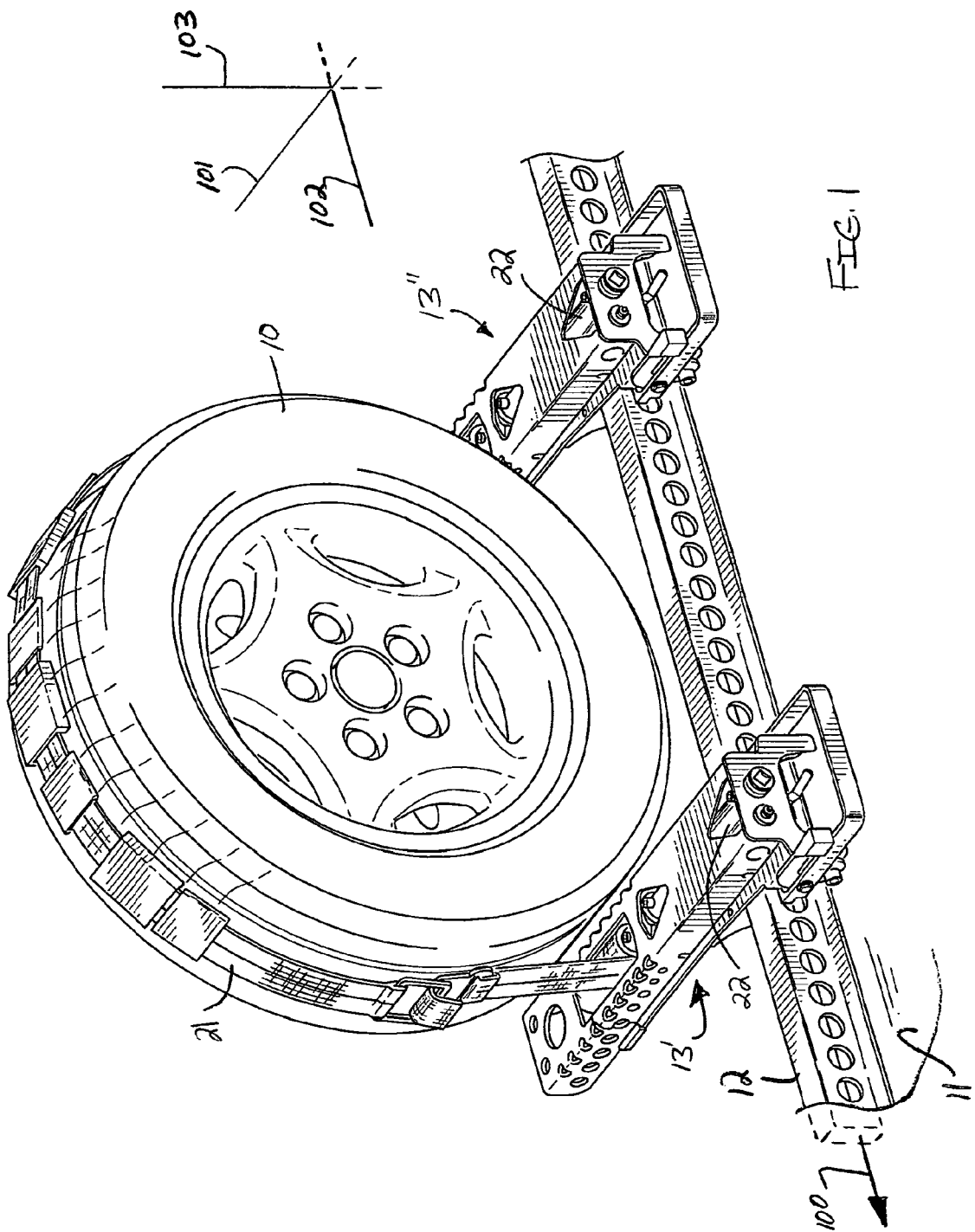
FIG. 1 is a top perspective view of a low-profile wheel chocking system according to the present invention showing two chock assemblies positioned adjacent a vehicular wheel atop a support surface with a rail mounted thereto.

A diagrammatic right-handed Cartesian system generically depicts the first (or X) dimension at 101, a second (or Y) dimension at 102, and a third (or Z) dimension at 103 throughout the drawing representations. An attempt has been made to repeatedly and dimensionally define the invention to aid the reader's comprehension thereof. In FIG. 1, a three-dimensional representation appears, and two-dimensional representations appear in subsequent drawing figures.

As may be understood from a consideration of FIG. 1, most motor vehicles are transported by rail transport at some point after manufacture. In view of the fact that railway cars are subjected to substantial impact loads and vibrations, it is essential that rail-transported vehicles be securely held in place on the decks of the railway cars during transit. Accordingly, the support surface 11 may be defined by the deck of a vehicle transport type rail car, and the apertured, linear rail 12 is securely mounted to such a support surface 11.

The wheel chocking system according to the present invention operates in cooperative association with such a support surface 11 and rail 12, and preferably includes a pair of low-profile chock assemblies as at 13' and 13", which assemblies 13' and 13" are fastenable to the rail 12. Further, the system contemplates certain wheel-harnessing means for harnessing the wheel 10 intermediate the chock assemblies 13' and 13".

Each chock assembly (as at 13' and 13") according to the present invention preferably comprises a robust, primarily metallic (e.g. steel) body construction 14 and certain fastening means for fastening the respective chock assemblies 13' and 13" to the rail 12 via the aperture structure(s) formed therein. In view of vehicular design trends requiring reduced chock profiles, the chock assembly according to the present invention has a reduced overall height as at 111 as compared to the overall height 112 of prior art chock assemblies as comparatively depicted in FIG. 6 versus 7.

The contemplated fastening means may be preferably exemplified by a pair of track pin assemblies, each of which track pin assemblies comprises a pin body as at 15 and a nut as at 16. The fastening means are preferably located inwardly of a first (or proximal) end 17 of the primary body construction 14.

The fastening means essentially function to fasten each chock assembly 13' and 13" to the apertured, linear rail 12 such that the chock assemblies 13' and 13" are parallel to one another and orthogonal to the linear rail 12 in chock adjacency to the vehicular wheel 10, and which vehicular wheel 10 is positioned so as to be radially orthogonal to each chock assembly 13' and 13" as generally depicted in FIG. 1.

The primary body construction 14 of each chock assembly 13 is fastened to the rail 12 via a body-to-rail interface structure or assembly. The body-to-rail interface structure or assembly comprises a support plate 40 and a rear pan construction 39. The rear pan construction 39 and support plate 40 are welded together such that pin-receiving apertures 41 formed in the support plate 40 are axially aligned with pin-receiving apertures 44 formed in forward, pin-receiving primary flanges 45 of the rear pan construction 39, which primary flanges 45 extend in the second and third dimensions 102 and 103.

Secondary flanges 46 extend in the first and third dimensions 101 and 103 from the primary flanges 45, and together with support arms 48 (extending in the first and third dimensions 101 and 103) and support arm-spanning section 49 (extending in the second and third dimensions 102 and 103) of the support plate 40, form box-like, hollow tubular attachment posts 47 through which posts 47 the pins 15 are insertable via pin-receiving apertures 41 and 44 and fastened thereto via nuts 16. Secondary flanges 46 are welded to support arm-spanning section 49 as may be seen from an inspection of FIG. 5.

Figure 3:
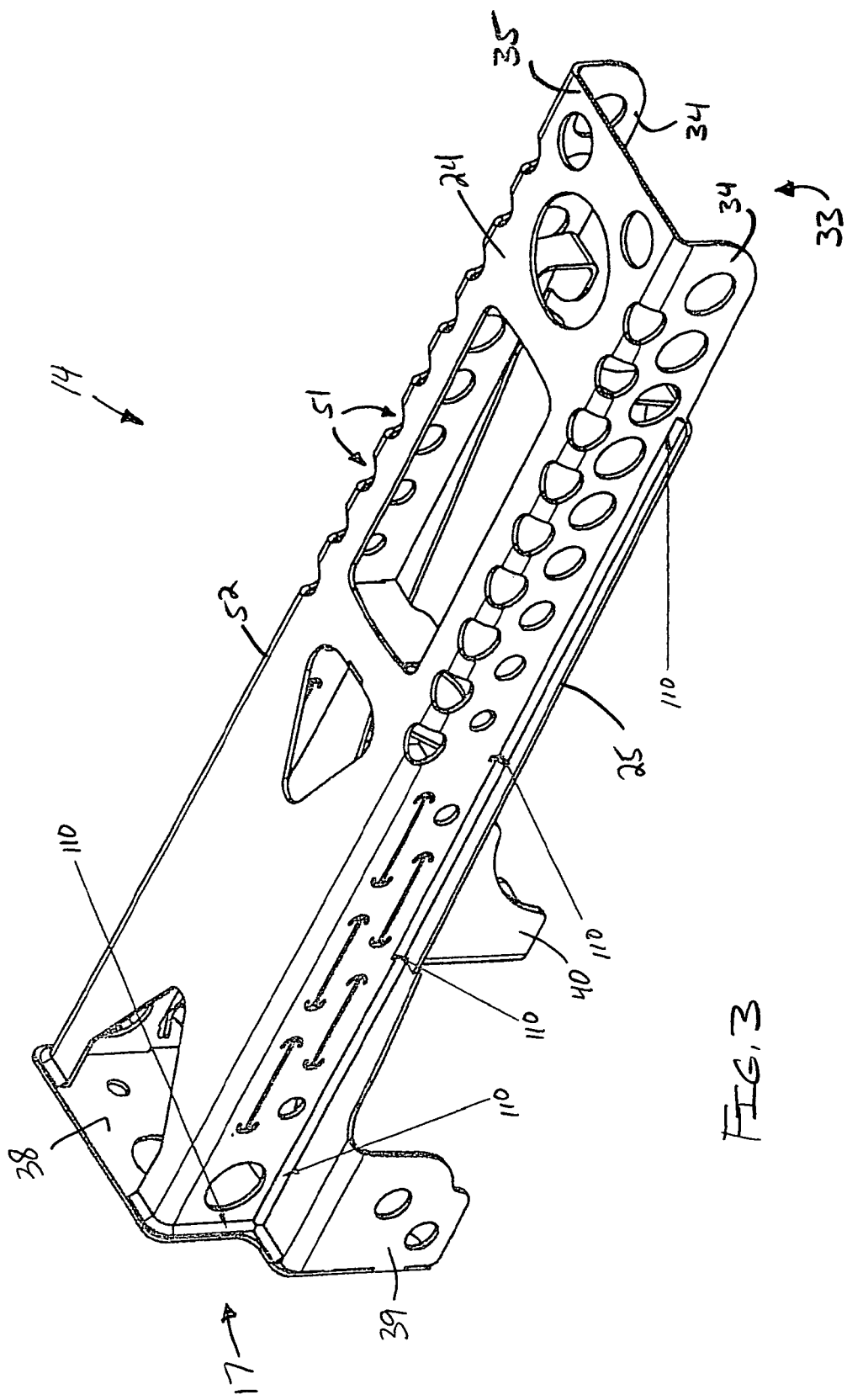
FIG. 3 is a second top or dorsal perspective view of the primary body construction of the chock assembly according to the present invention, viewed from the distal end.
Figure 4:
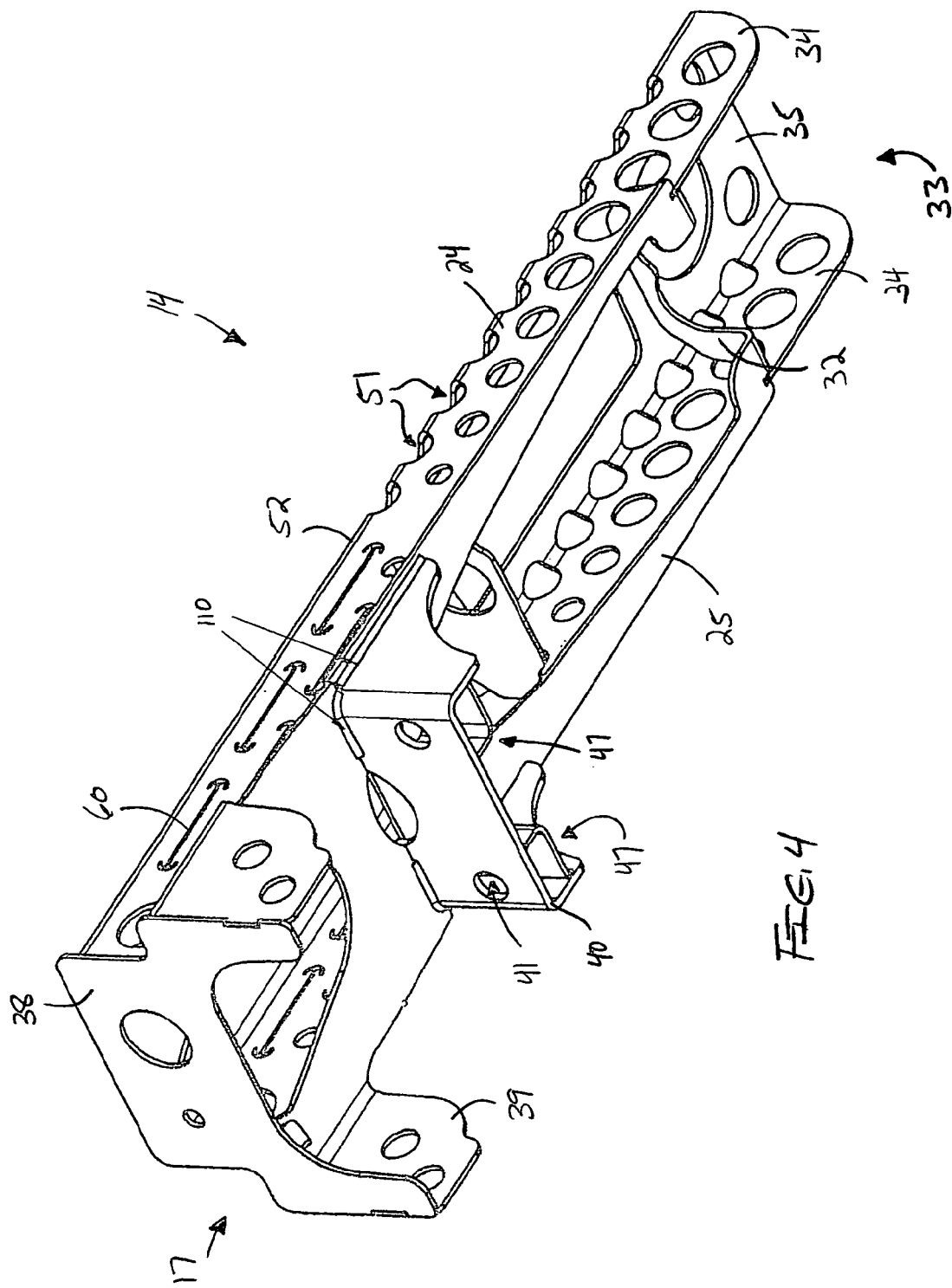
FIG. 4 is a first bottom or ventral perspective view of the primary body construction of the chock assembly according to the present invention, viewed from the proximal end.
Figure 5:
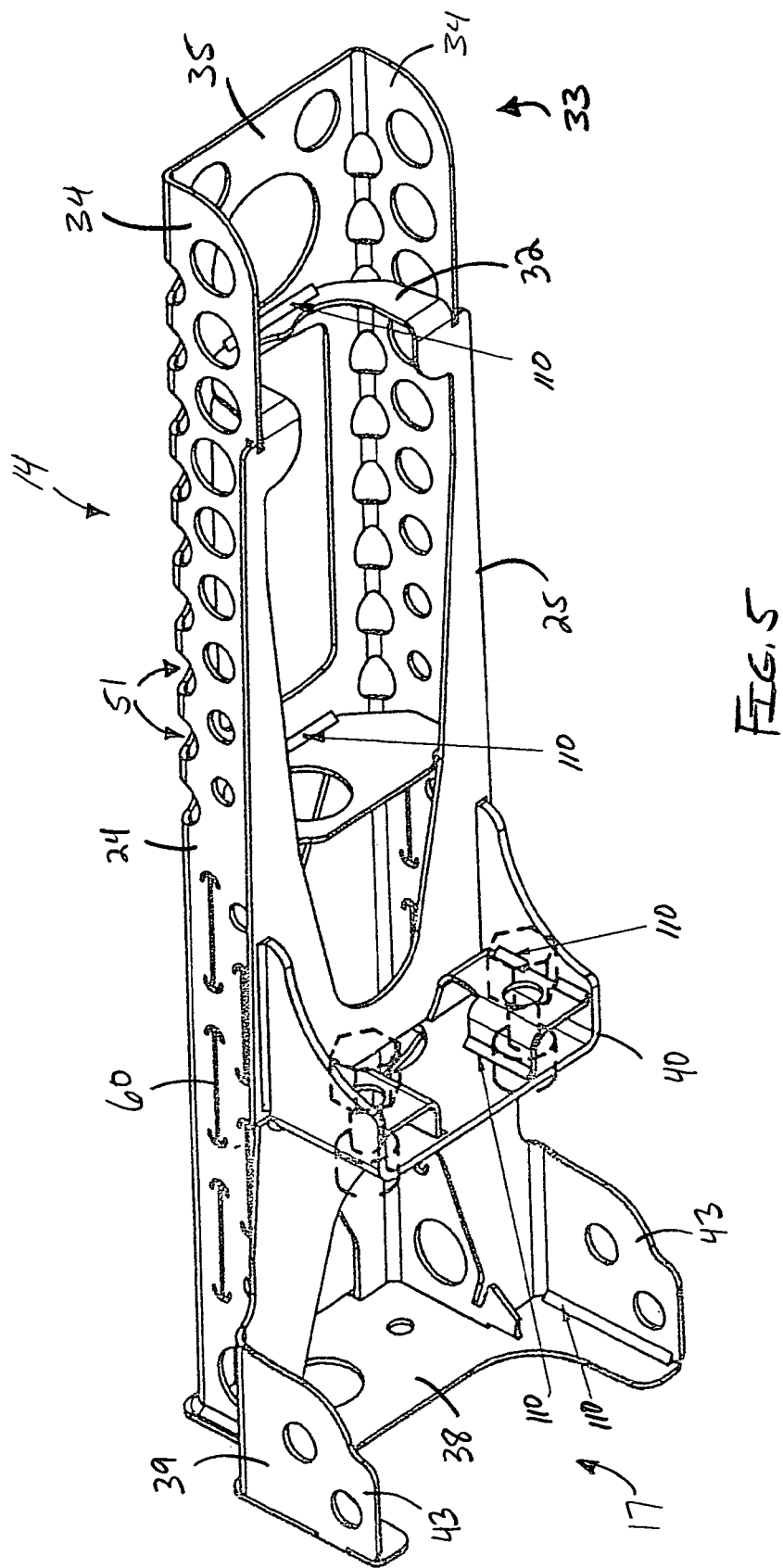
FIG. 5 is a second bottom or ventral perspective view of the primary body construction of the chock assembly according to the present invention, viewed from the distal end.
Figure 8:
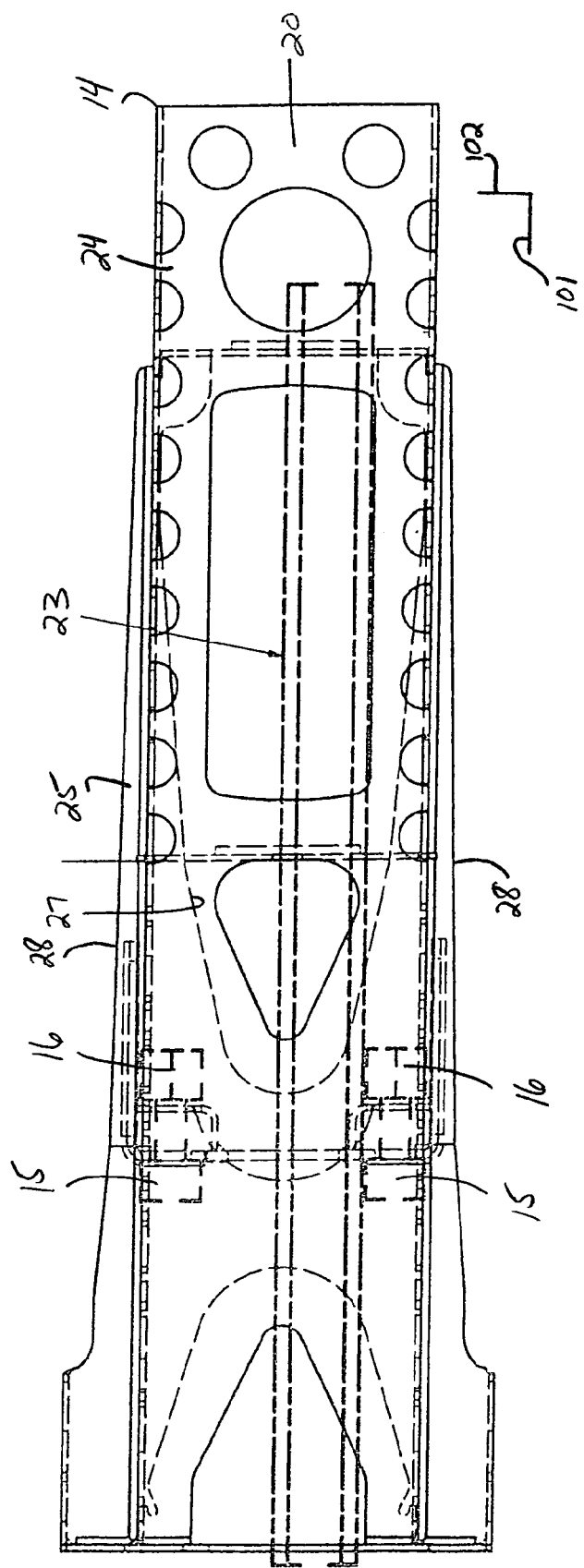
FIG. 8 is a top view of a preferred embodiment of the primary body construction according to the present invention depicting relative placement of a torque tube and fastening track pin assemblies (shown in broken lines) cooperatively associated with the chock assembly according to the present invention.
Figure 11:
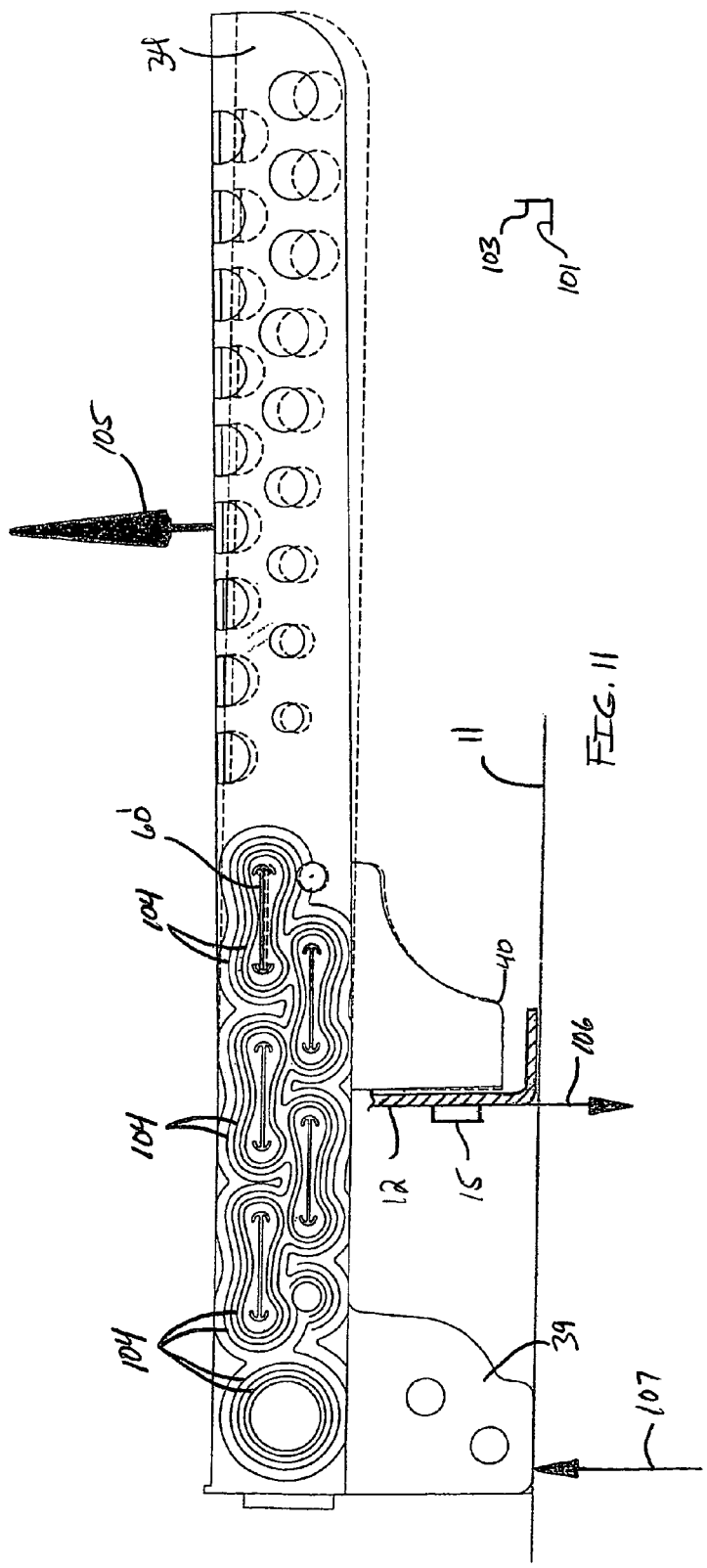
FIG. 11 is a lateral or side diagrammatic representation of a preferred primary body construction according to the present invention depicting relative displacement and attendant structural stress or strain of a primary body construction when experiencing a vertical load.

Weld sites throughout the primary body construction 14 are generally depicted and referenced at 110 in FIGS. 3-5. Referencing weld points 110 in FIG. 5, for example, it will be seen that the rear pan construction 39 further comprises downwardly extending wings 43, which wings 43 extend in the first and third dimensions 101 and 103, and which wings 43 are welded as at 110 to the winch plate 38. When the chock assembly is vertically loaded, support surface reaction forces 107 act directly upon the welded wing-to-winch plate site as generally depicted in FIG. 11.

The primary body construction 14 according to the present invention is believed central to the practice of the present invention insofar as it provides an extremely robust, stress-resistant chocking structure according to a first primary design objective, yet is embodied in an overall low-profile construction according to a second primary design objective, which objectives drove the key design specifications in view of current vehicular design trends and structural inadequacies noted in otherwise state of the art chock constructions.

Under certain expected conditions, railcars carrying vehicles experience longitudinal accelerations due to switching and other operations. Under these types of accelerations, for example, a wheel chock assembly on the rear or far side of a vehicular wheel 10 (opposite the direction of acceleration as depicted and referenced at 100 in FIG. 1) will experience compressive force(s) as the vehicular wheel 10 engages the rear side chock assembly 13" and downwardly directed forces act upon said chock assembly 13".

The chock assembly on the side of the vehicular wheel 10 in the direction of acceleration 100 or front side chock assembly as at 13' in FIG. 1 will experience a large upwardly directed vertical load (depicted at vector 105 in FIG. 11) pulling the chock assembly 13' upward off the railcar deck or support surface 11 via a tensile member (exemplified by a strong polymer-web strap or harness assembly 21), which tensile member interconnects the chock assemblies 13' and 13" and spans the vehicular wheel 10 thereby preventing it from significant movement within the railcar or atop the support surface 11.

The tensile member or strap (as at 21) or wheel-harnessing means is connected to each of the chock assemblies 13' and 13" generally via a torque tube assembly 22 and more particularly via an elongate torque tube (as at 23), which tube 23 is typically supported at three locations within the primary body construction 14. Inwardly adjacent the distal end 33 of the primary body construction 14 is preferably located a C-shaped arch support structure as at 32, which structure 32 comprises a tube-engaging surface 36 for engaging the tube 23 to locate it as well as support it against upward cantilever action. The second tube support structure or middle plate 37 is provided at roughly the middle of the primary body construction 14, and serves to transmit the major proportion of the vertical load 105 to the track pins 15 which anchor each of the chock assemblies 13' and 13" to the support surface 11 via the rail 12.

The third tube support structure or winch plate 38 is integrally connected to certain winch/ratchet mechanism or means and, during an upward pull on the tensile member or strap 21, transmits a downward force to the support surface 11—this force acts in as a so-called "couple" with a component of the upward force applied through the pins 15 to resist the body moment imparted by the strap load 105. Track pin reaction force(s) as at 106 act downward and support surface reaction forces as at 107 act upward to prevent bodily rotation or movement of the chock assembly 13'.

The wheel-harnessing means according to the present invention may thus be said to preferably comprise or operate in conjunction with certain tensioning means carried by and cooperably associated with the primary body construction 14 for selectively tensioning the wheel-harnessing means. The wheel-harnessing means may preferably comprise a harness or strap assembly as at 21 (for engaging the upper portions of the vehicular wheel 10) and the tensioning means may preferably comprise a torque tube assembly 22, which assembly 22 is engageable with the harness or strap assembly 21 for selectively tensioning the same, and applying force to the vehicular wheel 10 in a downward direction toward the support surface 11 via the strap or harness assembly 21.

It is believed that the torque tube assembly 22 and the harness or strap assembly 21 according to the present invention may be preferably defined more or less by state of the art assemblies operable in conjunction with the central feature of the present invention, namely, the primary body construction 14. Thus, when viewed systemically, the present invention may be said to comprise certain wheel-harnessing means and certain tensioning means so exemplified by the foregoing and illustrated examples in combination with the primary body construction(s) 14 of wheel-opposed chock assemblies 13' and 13".

The torque tube 23 of the torque tube assembly 22 (tensioning means) must be sized to structurally cooperate with the primary body construction 14 as well as various body construction support structures. For example, it is contemplated that the outer diameter of the torque tube 23 may be something on the order of 1 inch (or 2.54 centimeters), but must be able to rotate freely when carried by the primary body construction 14. Thus, the tube-accepting aperture 50 formed in the second tube support structure or middle plate 37, for example, would accordingly have a diameter (or major and minor axes) greater than 1 inch.

The primary body construction 14 will further experience some amount of (bending) stress as diagrammatically depicted at contour type lines 104 as generally depicted in FIG. 11. A primary feature of the primary body construction 14 centers on its Π-shaped or inverted U-shaped transverse cross-section as generally depicted in FIG. 10(*a*). The Π-shaped transverse cross section extends in the second dimension 102 and in the third dimension 103, and preferably comprises an integrally connected dual I-beam construction as at 18, which dual I-beam construction 18 comprises opposed I-beam sections 19 integrally interconnected at an upper span portion 20. Each dual I-beam construction 18 essentially functions to bear and distribute stress imposed on the primary body construction 14.

The Π-shaped transverse cross-section of the primary body construction 14 is preferably formed by an upper C-shaped channel construction as at 24 and a lower planar basal construction as at 25. The C-shape of the channel construction 24 extends in the second and third dimensions 102 and 103 as generally depicted in FIGS. 10(*a*) and 13(*a*). The basal construction 25 preferably comprises a U-shape (at a first planar basal section), which U-shape extends in the first and second dimensions 101 and 102. The basal construction 25 further integrally comprises C-shaped arch support 32, the plane of which is orthogonal to the U-shape.

The U-shape comprises opposed basal arms 26, which opposed basal arms 26 extend in the first dimension 101, and which opposed basal arms 26 each comprise inner edging as at 27 and outer edging as at 28. The inner edging 27 and outer edging 28 are preferably non-parallel in the second dimension 102 for forming flared cross member flanges 29 to the opposed webs 30 of the I-beam constructions 19. The U-shape further comprises a basal arm-spanning section 31 for interconnecting the basal arms 26. The basal arms 26 are preferably relatively wider in the second dimension at the basal arm-spanning section 31 for enhancing strength of the primary 14 body construction at the basal arm-spanning section 31.

Each primary body construction 14 may further preferably comprise certain C-channel support means, which C-channel support means extend in the second dimension 102 and third dimension 103 intermediate the primary length (extending in the first dimension 101) of the primary body construction 14 for enhancing the structural strength of the primary body construction 14. The C-channel support means may preferably be exemplified by the C-shaped arch support structure as at 32, and/or the middle plate 37. As indicated, the C-shaped arch support structure 32 may preferably be integrally formed with the basal arms 26 for enhancing structural strength of the primary body construction 14 inwardly of the second (or distal) end 33 thereof.

The C-channel construction 24 preferably comprises opposed channel arms 34 (structurally equivalent to webs 30), which opposed channel arms 34 extend in the first dimension 101 and the third dimension 103; and an arm-spanning channel section 35 (structurally equivalent to upper span portion 20), which channel section 35 extends in the first dimension 101 and the second dimension 102. The channel arms 34 and channel section 35 may preferably comprise a series of apertures, which apertures perform a number of diverse functions as specified in more detail hereinafter.

Figure 2:
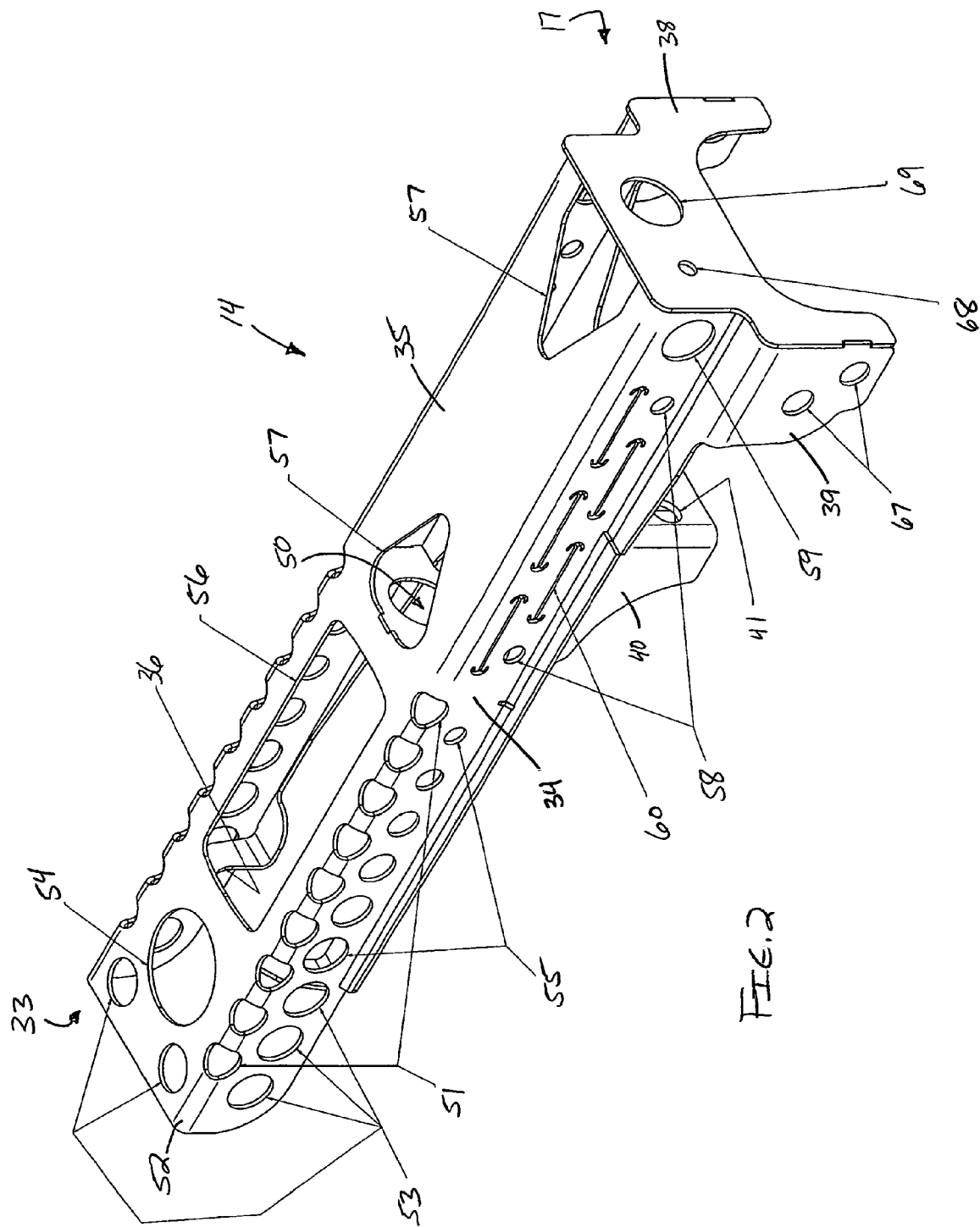
FIG. 2 is a first top or dorsal perspective view of a primary body construction of a chock assembly according to the present invention, viewed from the proximal end.

Referencing FIG. 2, the reader will see that the channel section 35 joins the channel arms 34 at channel edging 52, which channel edging 52 is preferably outfitted with edging apertures 51 for increasing the frictional contact surface area with the vehicular wheel 10 when in chock adjacency thereto. Further, the edging apertures 51 provide increased contact surface area for adhering rubber coating thereto, and thus may be said to provide certain enhanced coating retention means.

Moving from the distal end 33 toward the proximal end 17, the circular apertures referenced at 53 in FIG. 2 primarily function to reduce weight of the primary body construction. The relatively large diameter aperture 54 functions to both reduce weight and to provide a handle for enabling the user to carry the chock assembly 13. The series of holes referenced at 55 descend in diameter from the distal end 33 toward the proximal end 17 for reducing weight and for providing elastic response control means.

In other words, the series of apertures 55 extending intermediate the first (or proximal) end and the second (or distal) end comprise decreasing aperture diameters from the distal end toward the proximal end for reducing weight toward the distal end while increasing structural strength toward the proximal end. The nominally circular apertures at and between 55 have increasing diameters relative to their distance from the point of maximum stress for responding or controlling the structural response to the upwardly-directed design load as at 105. A deliberate secondary effect of this is to increase the elasticity of those regions of the primary body construction 14 in response to said load 105.

The primary function of the large rectangular aperture at 56 is to provide clearance for operation of the strap or harness assembly 21. In other words, the torque tube assembly 22 extends in the first dimension just below the plane of the channel section 35, and the aperture 56 allows the strap assembly 21 to interconnect with the torque tube assembly 22. The opposed triangular apertures 57 toward the proximal end 17 generally function to provide assembly clearance, handle means, elastic response control, and reduce weight.

The relatively small diameter apertures 58 nested among the slotted apertures 60 function primarily as means for controlling elastic response. The slotted apertures or primary stress or strain relief slots 60 have slot axes 66 extending in the first dimension for enabling channel arm flexure in the third dimension 103 inwardly of the first or proximal end 17. Referencing FIG. 11, the reader will note bodily stress as at contour lines 104 adjacent the strain relief slots 60.

The primary body construction 14 has an upper or dorsal side as at 61 and a lower or ventral side as at 62. The primary stress relief slots 60 comprise upper or dorsal slots 63 and lower or ventral slots 64 for enhancing flexure or elastic response in the third dimension 103. The dorsal slots 63 and ventral slots 64 are preferably staggered in the first and third dimensions 101 and 103 for further enhancing flexure or elastic response in the third dimension 103. Referencing FIG. 11(a), the reader will more readily note the displacement of slot 60' relative to the horizontal.

Figure 11A:
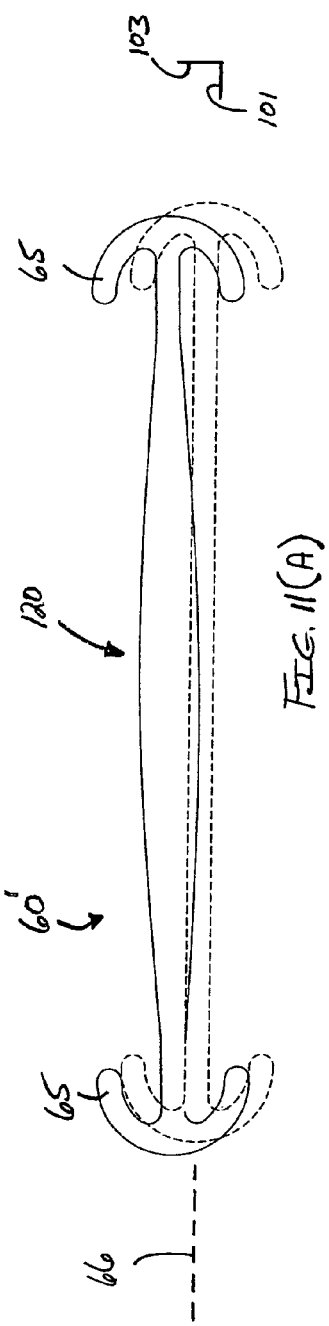
FIG. 11(A) is an enlarged diagrammatic depiction of a stress or strain relief slot formed in the primary body construction depicting relative displacement of the slot when the primary body construction experiences a vertical load.
Figures 19, 20:
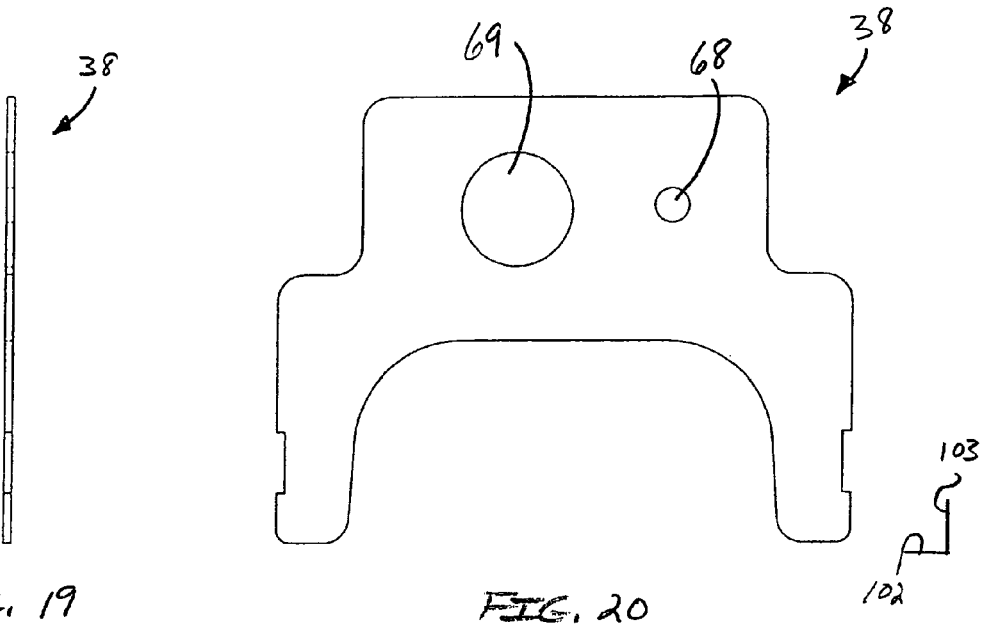
FIG. 19 is a lateral or side edge view of a winch plate of the primary body construction according to the present invention.
FIG. 20 is a distal plan view of the winch plate otherwise shown in FIG. 19.
Figure 21:
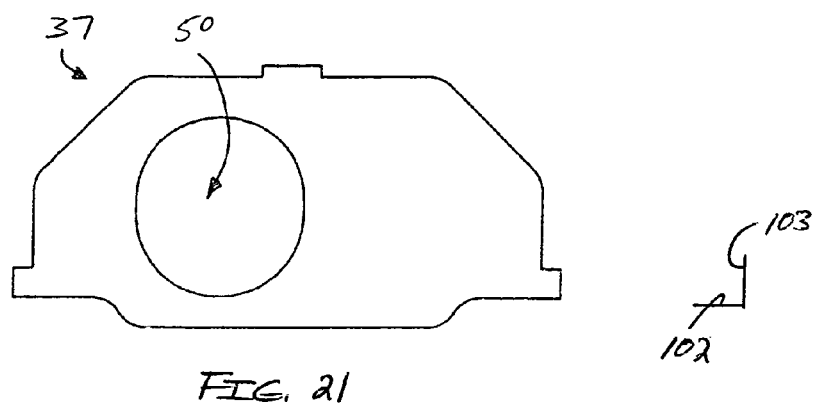
FIG. 21 is a distal plan view of a middle plate of the primary body construction according to the present invention.
Figure 22:
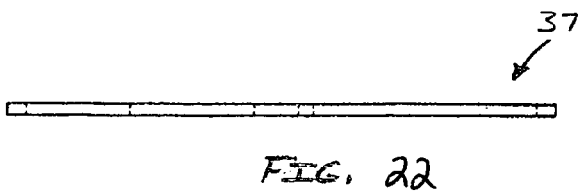
FIG. 22 is a bottom or ventral edge view of the middle plate otherwise shown in FIG. 21.

The reader should further note that the slot(s) 60 will experience a slight increase in width in the third dimension 103 as generally depicted in FIG. 11(a) at slot 60'. From a comparative inspection of the broken lines depicting slot 60' in a relaxed state versus the solid lines depicting slot 60' in a stressed state, the reader will note the relatively increased width (as at 120) of slot 60' when in the stressed state. The slot(s) 60 thusly structurally and elastically store energy. The greater the operational load, the larger the increase of the width 120.

The primary stress or strain relief slots 60 preferably comprise secondary stress or strain relief termini as at 65, which secondary stress relief termini 65 essentially function to prevent structural fracturing adjacent the primary stress relief slots 60. The secondary stress relief termini 65 are preferably semi-circular and extend in the first and third dimensions 101 and 103 relative to the slot axes 66. Referencing FIG. 11(a), the reader will see note that the respective primary stress relief slots 60 preferably radially interconnect the semi-circular secondary stress relief termini 65.

Aperture(s) 59 comprise relatively larger diameters compared to apertures 58 for enabling tool and/or finger access to operating mechanisms shielded by the C-shaped channel construction 24. Apertures 67 (and 41) provide certain hardware mounting means; and aperture 68 provides a pivot axis for a ratchet pawl. Apertures 69 and 50 are coaxial and preferably have a one-inch plus diameter for transferring load from the torque tube 23 as earlier discussed. Aperture 50 is roughly oval with its major axis extending in the third dimension 103 for allowing extra clearance in the event weld stress warps the primary body construction 14.

While the foregoing specifications set forth much specificity, the same should not be construed as setting forth limits to the invention but rather as setting forth certain preferred embodiments and features. For example, as prefaced hereinabove, it is contemplated that the present invention essentially provides a wheel chock construction or assembly as at 13' or 13" for chocking and restraining a vehicular wheel 10 upon a support surface as at 11.

The wheel chock construction or assembly according to the present invention preferably comprises a primary body construction having a primary length extending in a first dimension, and a Π-shaped transverse cross-section extending in a second and a third dimension. The Π-shaped transverse cross-section comprises an integrally connected dual I-beam construction, which dual I-beam construction comprises opposed I-beam sections integrally interconnected at an upper span portion. The dual I-beam construction functions to bear and distribute stress imposed on the primary body construction. The primary length of the primary body construction is chock-placeable such that the vehicular wheel is radially orthogonal to the primary length.

The Π-shaped transverse cross-section of the primary body construction is formed by an upper C-shaped channel construction and a lower planar basal construction, the C-shape of the channel construction extends in the second and third dimensions. The basal construction comprises a U-shape, which U-shape extends in the first and second dimensions.

The U-shape of the basal construction comprises opposed basal arms extending in the first dimension, which arms each comprise non-parallel inner edging and outer edging for forming flared cross members or flanges to the opposed I-beam constructions. The U-shape further comprises a basal arm-spanning section for interconnecting the basal arms. The basal arms are preferably relatively wider in the second dimension at the basal arm-spanning section for enhancing strength of the body construction at the basal arm-spanning section.

Each chock assembly according to the present invention further preferably comprises certain C-channel support means, which support means extend in the second and third dimensions intermediate the primary length for enhancing the structural strength of the body construction. The C-channel support means may preferably comprise a C-shaped arch support, which C-shaped arch support is integrally formed with or extended from the basal arms for enhancing structural strength of the primary body construction inwardly of a second or distal end thereof.

The C-shaped channel construction preferably comprises opposed channel arms extend in the first and third dimensions and an arm-spanning channel section extending in the second and third dimensions. The channel arms and channel section comprise a series of apertures for generally reducing material content, weight, and cost of the primary body construction. The channel section join the channel arms at channel edging, which edging is preferably outfitted with apertures for increasing frictional contact surface area with the vehicular wheel when in chock adjacency thereto.

A series of circular apertures extending intermediate the first or distal end and the second or proximal end comprise decreasing aperture diameters from the first end toward the second end for enhancing structural strength at or toward the first end. The channel arms each comprise primary strain relief slots having slot axes extending in the first dimension for enabling channel arm flexure or elastic response control in the third dimension inwardly of the second end.

The primary body construction has an upper or dorsal side and a lower or ventral side. The primary relief slots comprise upper or dorsal slots and lower or ventral slots, which dorsal and ventral slots may be preferably staggered in the first and third dimensions for enhancing flexure or elastic response in the third dimension. The primary strain relief slots may further comprise secondary strain relief termini for preventing structural fracturing adjacent the primary strain relief slots. The secondary strain relief termini are preferably semi-circular, extending in the first and third dimensions relative to the slot axes such that the slot axes radially interconnect the semi-circular secondary strain relief termini.

Accordingly, although the invention has been described by reference to certain preferred embodiments, it is not intended that the novel arrangement be limited thereby, but that modifications thereof are intended to be included as falling within the broad scope and spirit of the foregoing disclosures and the appended drawings.

I claim:

1. A low-profile wheel chocking system for chocking and restraining a wheel upon a support surface adjacent a rail mounted to the support surface, the wheel chocking system comprising:
a pair of low-profile chock assemblies, each chock assembly comprising a primary body construction and fastening means, each primary body construction having a primary length extending in a first dimension, the fastening means being located inwardly of a first end of each primary body construction, each primary body construction comprising a Π-shaped transverse cross-section extending in a second and a third dimension, the Π-shaped transverse cross-sections each comprising opposed I-beam sections integrally interconnected at an upper span portion, the Π-shaped transverse cross-sections for bearing and distributing stress imposed on each primary body construction, the fastening means for fastening each chock assembly to the rail such that the chock assemblies are parallel to one another and orthogonal to the rail in chock adjacency to the wheel, the wheel being radially orthogonal to each chock assembly.

2. The wheel chocking system of claim 1 comprising wheel-harnessing means for harnessing the wheel intermediate the chock assemblies.

3. The wheel chocking system of claim 2 wherein the wheel-harnessing means comprise tensioning means carried by and cooperably associated with the primary body construction for selectively tensioning the wheel-harnessing means.

4. The wheel chocking system of claim 1 wherein the Π-shaped transverse cross-section of each primary body construction is formed by an upper C-shaped channel construction and a lower planar basal construction, the C-shape of the channel constructions extending in the second and third dimensions, the basal constructions each comprising a U-shape, each U-shape extending in the first and second dimensions.

5. The wheel chocking system of claim 4 wherein each U-shape comprises opposed basal arms extending in the first dimension, each basal arm comprising inner edging and outer edging, the inner and outer edging being non-parallel in the second dimension for forming flared flanges to the opposed I-beam sections.

6. The wheel chocking system of claim 5 wherein each U-shape comprises a basal arm-spanning section for interconnecting the basal arms, the basal arms being relatively wider in the second dimension adjacent the basal arm-spanning section for enhancing strength of the primary body construction at the basal arm-spanning section.

7. The wheel chocking system of claim 4 wherein each C-shaped channel construction comprises opposed channel arms extending in the first and third dimensions and an arm-spanning channel section extending in the second and third dimensions, the channel arms and channel section comprising a series of apertures for reducing weight and controlling elastic response of the primary body construction.

* * * * *